United States Patent Office 3,451,212
Patented June 24, 1969

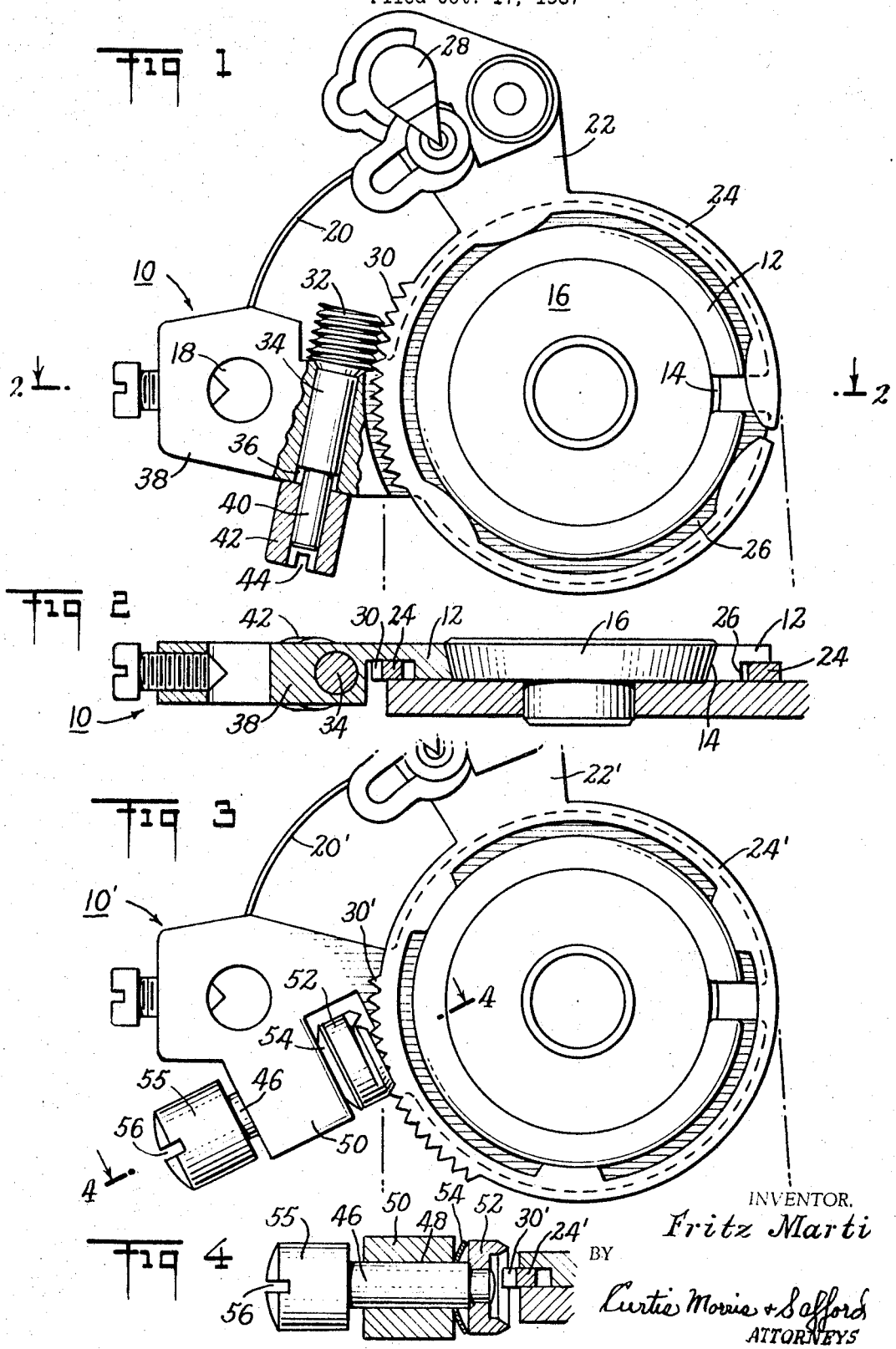

3,451,212
REGULATOR DEVICE FOR WATCH MOVEMENT
Fritz Marti, La Chaux-de-Fonds, Switzerland, assignor to Portescap Le. Porte-Echappement Universal S.A., La Chaux-de-Fonds, Switzerland
Filed Oct. 17, 1967, Ser. No. 675,848
Claims priority, application Switzerland, Oct. 21, 1966, 15,412/66
Int. Cl. G04b 17/14
U.S. Cl. 58—109                                     5 Claims

ABSTRACT OF THE DISCLOSURE

A regulator device for a watch movement providing for the independent adjustment of the beat-setting and the active length of the balance spring. The adjustments are made by a stud-holder that is movable relative to the balance wheel bridge and an angularly adjustable key-holder regulator that has its drive screw mounted in the movable stud-holder.

This invention relates to regulator devices for watch movements and more particularly to regulator devices for adjusting the beat-setting and the active length of the balance spring independently of each other.

Watch movements are provided with various adjustments that can be made to regulate the accuracy of the watch. Two of these adjustments, the beat-setting and active length of the balance spring, control the oscillation of the balance wheel; and the balance wheel, through the escapement mechanism, controls the accuracy of the watch itself. The adjustment for the beat-setting is made by changing the angular relationship between the "stud-holder" (a support for the free end of the outer turn of the balance spring) with respect to the fixed escapement mechanism. The active length of the balance spring is regulated by a "key-holder regulator" (essentially a key and pin on opposite sides of the balance spring near the free end of the outer turn) that acts as a mechanical damp to the spring as it oscillates during its unwinding. By moving the key-holder regulator along the spring the active length of the spring is altered thus changing the effect of the movement imparted to the balance wheel by the spring.

At present, regulating devices to adjust the beat-setting and active length of the balance spring comprise a stud-holder, which can be turned concentrically to the balance staff, and a key-holder regulator, mounted on the balance wheel bridge, that is driven by a worm gear mechanism. In this arrangement, since the key-holder regulator is driven by a worm mounted on the balance wheel bridge, any adjustment of the active length of the balance spring also affects the beat-setting of the balance spring. This effect is equivalent to modifying the adjustment of the watch and necessitates a concurrent adjustment in the position of the stud-holder. This is a disturbing drawback as the precise adjustment of the beat-setting of the balance spring and the active length of the spring frequently require numerous attempts and adjustments by a trial and error process.

Further, since the key-holder regulator is geared to the balance wheel bridge, the size of the regulator is dependent upon the size of the balance wheel bridge and the balance wheel itself. Thus for various sized movements many different sizes of key-holder regulators are needed and for very small movements there is the added difficulty of providing exceedingly fine gearing mechanisms.

It is therefore an object of the present invention to provide a regulating device for a watch movement wherein the beat-setting of the balance spring and the active length of the balance spring may be adjusted independently of each other.

It is another object of the present invention to provide a regulating device for a watch movement wherein the adjustment screw for the stud-holder is mounted independently of the balance wheel bridge and is therefore capable of being adapted to watch movements of varying sizes.

It is a still further object of the present invention to provide a regulatiing device for a watch movement wherein the adjustment screw, since it is independent of the balance wheel bridge, can be made larger than heretofore for use with even very small watch movements having small balance wheels.

The present invention provides a regulating device for watch movements comprising an angularly adjustable key-holder regulator and a movable stud-holder that are independently adjustable relative to the escapement mechanism of the watch. The drive screw to adjust the position of the key-holder regulator is mounted within the movable stud-holder. This arrangement makes it possible to adjust the beat-setting of the balance spring and to then modify the active length of the balance spring without requiring a further adjustment to the beat-setting of the balance spring.

A more complete appreciation of the invention and many of the attendant advantages thereof will be readily apparent as the same becomes better understood by reference to the following detailed description when considered in conjunction with the accompanying drawing wherein:

FIGURE 1 is a plan view, partly in section, of one embodiment of the present invention, looking down at the balance wheel bridge;

FIGURE 2 is a view, partly in section, taken along line 2—2 of FIGURE 1;

FIGURE 3 is a plan view, similar to FIGURE 1, showing an alternate embodiment of the present invention;

FIGURE 4 is a view, partly in section, taken along line 4—4 of FIGURE 3.

Referring now to FIGURES 1 and 2, the regulator device includes a stud-holder 10 having a split annular ring 12 that is fitted with a relatively tight friction fit to beveled rim 14 of balance wheel bridge 16. Stud 18 is carried by the stud-holder 10 and holds the end of the outer turn of balance spring 20 in proper angular position with respect to the escapement mechanism (not shown). Adjustment of this angular relationship effects the operation known as "setting-to-mark" or the beat-setting of the balance spring by angularly displacing the stud-holder 10, and thus the end of the spring, with respect to its support, the balance wheel bridge 16.

A key-holder regulator 22 carried by a split annular ring 24 is mounted with a sliding friction fit in a circumferential channel 26 on annular ring 12 of stud-holder 10. Key-holder regulator 22 includes a key 28 that, in cooperation with a pin (not shown), fixes the active length of the balance spring 20.

Split annular ring 24 of the key-holder regulator 22 is provided with geared teeth 30 in a portion of its periphery that mesh with worm gear 32 on an end of shaft 34. Since it is more practical to turn a fine pitch thread on a worm gear than to cut fine teeth in a gear, the pitch of the threads of worm gear 32 is finer than the pitch on teeth 30 to obtain small incremental adjustments. Worm 32 and shaft 34 are tangentially housed in a smooth bore 36 in a lug 38 extending from the annular ring 12 of the stud-holder 10. An end 40 of shaft 34, having a reduced diameter, extends beyond lug 38 and has a sleeve 42, with slot 44 for an operating tool, press-fit thereon. The sleeve 42 provides an axial stopper for the worm 32 by resting against lug 38. Turning sleeve 42 rotates worm 32 causing annular ring 24 of the key-holder regulator to rotate and, thus, moves the key-holder regulator relative to balance spring 20 to thereby modify the active length of the balance spring.

In an alternate embodiment shown in FIGURES 3 and 4, a drive shaft 46 is rotatably mounted in a bore 48 provided in a lateral extension lug 50 of the stud-holder 10'. Drive shaft 46 is radially oriented, within the accuracy of a very small angle, with respect to annular ring 24' of key-holder regulator 22' and is provided with a helicoidal cylindrical screw 52 that engages geared sector 30' on the key-holder regulator.

The pitch of helicoidal screw 52 is cut in such a manner that one revolution of the screw displaces the geared sector 30' by one tooth. Screw 52 is rigidly connected to shaft 46 and there is a slight axial play between screw 52 and lug 50 to allow the shaft 46 and screw 52 to pivot slightly in lug 50. Screw 52 is pressed against the geared sector 30' by a resilient washer 54 which is positioned over shaft 46 to rest against lug 50 and screw 52. Stop sleeve 55, provided with a slot 56 for an operating tool, is press-fit on the end of shaft 46 and, in conjunction with the washer 54, retains the drive screw in engagement with the teeth 30'. Rotation of sleeve 54 provides concurrent movement of the key-holder regulator 22' as in the embodiment of FIGURE 1.

It is thus seen that a regulator device for a watch movement is provided wherein the beat-setting of the main spring may be adjusted by rotating the stud-holder, holding the end of the balance spring, relative to the balance wheel bridge. The active length of the balance spring may then be changed by moving the key-holder regulator without affecting the adjustment of the beat-setting of the spring.

What is claimed is:

1. In a watch movement having a balance spring and a balance wheel bridge for supporting a balance wheel, a regulator for adjusting the beat-setting and active length of the balance spring comprising:
   a stud-holder adapted to hold the free end of the outer turn of said balance spring;
   said stud-holder being mounted for movement relative to said balance wheel bridge;
   a key-holder regulator adapted to engage said balance spring and movable relative thereto to thereby alter the active length of said balance spring;
   said key-holder regulator being movable relative to said stud-holder; and
   means carried by said stud-holder and in operable engagement with said key-holder regulator to move said key-holder regulator relative to said stud-holder and to said balance spring.

2. A regulator device according to claim 1 wherein said stud-holder includes an annular ring mounted with a tight friction fit on said balance wheel bridge;
   said key-holder regulator includes an annular ring mounted with a sliding friction fit on said annular ring of said stud-holder;
   said annular ring of said key-holder regulator having geared teeth around at least a portion of its periphery; and wherein
   said means carried by said stud-holder in operable engagement with said key-holder regulator is a gearing means in said stud-holder and in engagement with said geared portion of said key-holder regulator.

3. The regulator device according to claim 2 wherein said gearing means carried by said stud-holder is a worm gear mounted tangentially to said geared portion of said key-holder regulator whereby rotation of said worm gear produces relative movement between said stud-holder and said key-holder regulator.

4. The regulator device according to claim 2 wherein said gearing means carried by said stud-holder is a helicoidal screw arranged radially with respect to the annular ring of said key-holder regulator whereby rotation of said screw produces relative movement between said stud-holder and said key-holder regulator.

5. The regulator device according to claim 4 including means to elastically maintain said screw in engagement with said geared portion.

References Cited

UNITED STATES PATENTS

| 2,982,086 | 5/1961 | Loretan | 58—111 |
| 3,168,832 | 2/1965 | Fazio | 58—109 |

FOREIGN PATENTS

| 1,295,468 | 5/1962 | France. |
| 1,299,952 | 6/1962 | France. |
| 1,200,750 | 9/1965 | Germany. |
| 257,460 | 10/1948 | Switzerland. |

RICHARD B. WILKINSON, *Primary Examiner.*

G. H. MILLER, JR., *Assistant Examiner.*